Oct. 27, 1942.   E. H. LAND   2,299,906
LIGHT-POLARIZING MATERIAL COATED WITH A PHOTOSENSITIVE LAYER
Filed May 27, 1939

INVENTOR.
Edwin H. Land
BY Brown & Jones
ATTORNEYS

Patented Oct. 27, 1942

2,299,906

UNITED STATES PATENT OFFICE 2,299,906

LIGHT-POLARIZING MATERIAL COATED WITH A PHOTOSENSITIVE LAYER

Edwin H. Land, Boston, Mass., assignor to Polaroid Corporation, Dover, Del., a corporation of Delaware Application May 27, 1939, Serial No. 276,231

15 Claims. (Cl. 95—8)

This invention relates to a light-polarizing material coated with a photosensitive layer.

Objects of the invention are to provide a light-polarizing surface having thereon a layer of photosensitive material; a transparent support providing a light-polarizing surface coated with photosensitive material; a light-polarizing film or sheet having a coating of a photosensitive gelatine emulsion, and a product of the character described for use in connection with the preparation of images, designs and the like showing a photographic contrast which is a function of the direction of vibration of polarized light traversing the said image.

Other objects of the invention will in part be obvious and will in part appear hereinafter.

The invention accordingly comprises an article of manufacture possessing the features, properties and the relation of elements which will be exemplified in the article hereinafter described and the scope of the application of which will be indicated in the claims.

Figure 1:
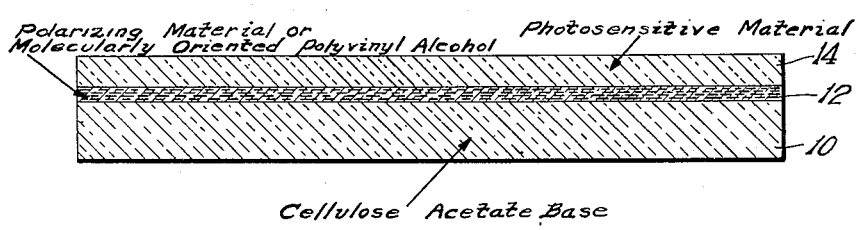
Figure 2:
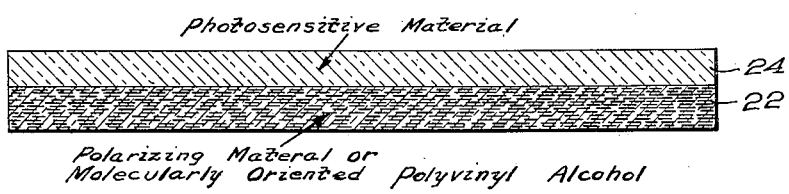

For a fuller understanding of the invention, reference should be had to the accompanying drawing, in which:

Figure 1 shows diagrammatically and in section a device embodying one form of the invention; and Fig. 2 is a similar view of a modified form of the invention.

This invention contemplates the porvision of a composite sheet adapted for use in connection with the preparation of images and designs, such as photographic reproductions, in a light-polarizing material. To this end it contemplates the provision of a preferably thin layer or film of material which is either a light-polarizing material or which is a material adapted to be treated so as to become a light polarizer, having in intimate contact with one surface thereof a photosensitive material and in certain instances bonded to a suitable transparent support. Such an article of manufacture is shown, for example, in Fig. 1, where 10 represents a supporting sheet, for example a sheet of cellulose acetate or other transparent medium, having on one of its surfaces a thin film-like layer of a light-polarizing material 12, which in turn is coated on its opposite surface with a photosensitive material 14.

The intermediate layer 12 may comprise in one form of the invention a thin film of a suspension of light-polarizing crystals in a suitable suspending medium. A suitable suspension may comprise a highly concentrated suspension of oriented, minute, herapathite-like polarizing crystals, such as crystals of a polarizing polyiodide, in a suspending medium comprising an incomplete polymerized polyvinyl acetal resin. The suspension may be less than .0005 inch thick.

It will be apparent that other polarizing films may be employed. The layer 12 may, for example, comprise a deposit of oriented polarizing crystals, such as plates or large crystals of a herapathite-like material. Any other suitable polarizing film or surface may be employed. It may for example comprise a layer of a polarizing, transparent, stained, or otherwise treated plastic such as polyvinyl alcohol, which has been stretched to orient its molecules.

This film may be bonded to a transparent support where a support is found desirable. In Fig. 2 there is shown a modified form of the present invention in which 22 represents a somewhat heavier and self-supporting polarizing film having a photosensitive layer 24 applied to one face thereof. In this form of the invention, no support is employed.

Where a support is employed, it may comprise either a rigid film or plate, such as a glass sheet, or a flexible supporting film.

The photosensitive layer, shown as at 14 in Fig. 1 and as at 24 in Fig. 2, should preferably comprise a layer of material which may adhere directly to a surface of the polarizing film. Any suitable photosensitive material which does not react with the polarizing film may be employed. A suitable material is a photosensitive gelatine emulsion, such as is commonly employed in connection with wash-off relief film and comprising a suspension of a photosensitive salt such, for example, as a silver halide such as silver bromide, or a dichromate. It is to be understood that whenever the term "photosensitive" is used herein, it means a sensitivity to light similar to that possessed by such emulsions, that is to say, a light-sensitivity of a character useful in photographic processes.

In using the product of the present invention, exposure to light of the photosensitive material is preferably made through the polarizing film. The sheet is then placed in a developer to develop the exposed photosensitive material, which may be treated in the usual way to form, for example, a relief or resist in direct contact with one face of the polarizing element. In this condition, the sheet may be subjected to the action of media destructive of the polarizing properties of the polarizing layer. The resist in contact with the layer acts to give a varying degree of protection to those portions of the polarizing layer underlying the resist. After the polarizing layer has been subjected to the destructive action, the resist may be removed and an image showing photographic contrast, which is a function of the direction of vibration of polarized light transmitted by the image, will appear in the polarizing film.

In another modification of the invention, the film 12 or 22 may comprise material, for example a sheet of a plastic having long chain molecules, such as regenerated cellulose or polyvinyl alcohol stretched or otherwise treated so as to substantially orient its molecules, which is adapted upon further treatment to show light-polarizing properties. If such a sheet is coated with photosensitive material and treated in the manner previously described, so that a resist is formed against one surface of the sheet, the resist may then act to prevent the conversion of the underlying portions of the sheet to a light-polarizing material when the sheet is subjected to the action of a substance, for example a stain or dye such as a stain comprising iodine, which is adapted, when the sheet is in the oriented condition described, to convert it to a light-polarizer. Under these circumstances, as before, the finished layer or sheet 12 or 22, after the removal of the resist, will show a design or image in polarized light, the photographic contrast of which is a function of the direction of vibration of polarized light traversing the image.

It will be understood that the materials specified as useful in the formation of the products of the present invention are to be deemed illustrative only. For example, many forms of light-polarizing films may be used. Many different supporting plates or sheets may be employed. Many different forms of photosensitive materials may be employed, and a variety of materials adapted to be converted into light-polarizing sheets may be used in the practice of the invention. All such uses are to be deemed to fall within the scope of the invention.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described and all statements of the scope of the invention which, as a matter of language, might be said to fall therebetween.

Having described my invention, what I claim as new and desire to secure by Letters Patent is:

1. As a new article of manufacture, means providing a dichroic light-polarizing surface and a coating thereon of photosensitive material.

2. As a new article of manufacture, means providing a dichroic light-polarizing surface and a coating thereon of a photosensitive gelatine emulsion.

3. In combination, a transparent supporting sheet, a dichroic light-polarizing layer affixed to one surface of said sheet and a layer of a photosensitive material affixed to and overlying said light-polarizing layer.

4. In combination, a transparent supporting sheet, a dichroic light-polarizing layer comprising an oriented suspension of minute polarizing particles in a transparent medium affixed to one surface of said sheet and a layer of a photosensitive material affixed to and overlying said light-polarizing layer.

5. In combination, a transparent flexible supporting sheet, a dichroic light-polarizing layer affixed to one surface of said sheet and a layer of a photosensitive gelatine emulsion affixed to and overlying said light-polarizing layer.

6. A sheet of polyvinyl alcohol having its molecules substantially oriented and having a coating on one of its surfaces of a photosensitive material.

7. A sheet of polyvinyl alcohol having its molecules substantially oriented and having a coating on one of its surfaces of a photosensitive gelatine emulsion.

8. As a new article of manufacture, means providing a layer comprising dichroic light-polarizing material and showing an image, the photographic contrast of which is a function of the direction of vibration of polarized light traversing said layer, said layer having affixed thereto a developed resist.

9. As a new article of manufacture, means providing a layer comprising dichroic light-polarizing material and showing an image, the photographic contrast of which is a function of the direction of vibration of polarized light traversing said layer, said layer having affixed thereto a developed resist formed of an exposed photosensitive gelatine emulsion.

10. As a new article of manufacture, means providing a layer comprising dichroic light-polarizing material comprising polyvinyl alcohol and showing an image, the photographic contrast of which is a function of the direction of vibration of polarized light traversing said layer, said layer having affixed thereto a developed resist.

11. As a new article of manufacture, means providing a layer comprising dichroic light-polarizing material comprising oriented polarizing particles and showing an image, the photographic contrast of which is a function of the direction of vibration of polarized light traversing said layer, said layer having affixed thereto a developed resist.

12. A new article of manufacture comprising a layer of a substance from the class consisting of the dichroic light-polarizers and molecularly oriented polyvinyl alcohol and a coating thereon of photosensitive material.

13. As a new article of manufacture, means providing a dichroic light-polarizing surface and a coating thereon comprising a photosensitive salt.

14. In combination, a transparent supporting sheet, a dichroic light-polarizing layer fixed to one surface of said sheet and a layer comprising a photosensitive salt fixed to and overlying said light-polarizing layer.

15. As a new article of manufacture, a sheet of polyvinyl alcohol having its molecules oriented to substantial parallelism and having a coating on one of its surfaces comprising a photosensitive salt.

EDWIN H. LAND.